United States Patent [19]

Kim

[11] Patent Number: 5,348,246

[45] Date of Patent: Sep. 20, 1994

[54] LINE GUIDE FOR BAIT CAST REEL

[75] Inventor: Hyunkyu Kim, Incheon, Rep. of Korea

[73] Assignee: Zebco Corporation, Tulsa, Okla.

[21] Appl. No.: 914,262

[22] Filed: Jul. 15, 1992

[51] Int. Cl.⁵ .......................................... A01K 89/015
[52] U.S. Cl. ................................ 242/279; 242/312
[58] Field of Search ............... 242/278, 279, 280, 281, 242/310, 312, 314

[56] References Cited

U.S. PATENT DOCUMENTS

| | | | |
|---|---|---|---|
| 1,344,289 | 6/1920 | Case | 242/280 |
| 1,579,076 | 3/1926 | Case | 242/279 |
| 1,688,135 | 10/1928 | Case | 242/279 |
| 1,690,401 | 11/1928 | Case | 242/304 |
| 2,149,413 | 3/1939 | Balz et al. | 242/279 |
| 2,338,126 | 1/1944 | Maynes | 242/274 |
| 3,447,760 | 6/1969 | Sarah | 242/279 |
| 3,670,855 | 6/1972 | Lemery | 188/82.3 |
| 4,042,186 | 8/1977 | Moosberg | 242/279 |
| 4,402,470 | 9/1983 | Hamayasu | 242/286 |
| 4,557,429 | 12/1985 | Atobe | 242/280 |
| 4,580,741 | 4/1986 | Murakami et al. | 242/280 |
| 4,666,101 | 5/1987 | Atobe | 242/280 |
| 4,747,560 | 5/1988 | Karlsson | 242/260 |
| 4,772,410 | 9/1988 | Sato | 242/279 |
| 4,807,827 | 2/1989 | Welch | 242/279 |
| 4,905,930 | 3/1990 | Puryear et al. | 242/310 |
| 4,974,792 | 12/1990 | Miyazaki | 242/279 |

Primary Examiner—Daniel P. Stodola
Assistant Examiner—Michael R. Mansen
Attorney, Agent, or Firm—Wood, Phillips, VanSanten, Hoffman & Ertel

[57] ABSTRACT

A bait cast reel of the type having a line-carrying spool, a rotatable crank handle with an associated crank shaft for imparting rotation to the spool to wind line thereon, a line guide, and a worm gear operable in response to rotation of the crank shaft for causing reciprocative movement of the line guide across the spool as the spool is rotated to thereby evenly distribute line on the spool, wherein the structure of the guide track (guide) for the line guide, and, in particular, the cross-sectional shape of the guide, matches the cross-sectional shape of an opening in the frame of the reel such that during assembly the guide may be aligned with and inserted through the matching opening. Thereafter, the guide is rotated so that a portion is out of alignment with the opening and an attaching member is passed through the frame and through the out of alignment portion of the guide. The guide is positioned to support the line guide as the line guide is reciprocated to evenly lay the line on the spool.

11 Claims, 2 Drawing Sheets

LINE GUIDE FOR BAIT CAST REEL

BACKGROUND OF THE INVENTION

1. Field of the Invention

This invention relates to bait cast fishing reels and, more particularly, to those portions of the reel that constitute the structure of a reciprocating line guide.

2. Background Art

In a conventional bait cast fishing reel, a line-carrying spool is rotated by turning a hand crank which drives a gear train to rotate the spool. The spool is mounted for rotation between two side plates which constitute a basic frame for the reel and to which are attached appropriate side covers for covering the aforesaid gear train and other mechanisms which may be employed on the reel and which need to be protected from dirt and the elements of the reels environment. Commonly said reels include a line guide which moves back and forth to distribute the line being retrieved evenly over the spool. Line guides are typically driven in such a manner by a double helix worm gear rotated in relation to the speed of the spool by a drive mechanism actuated by the turning of the crank.

The manner of assembly of bait cast reels is driven by the economy of the procedure. The fewer parts involved and the fewer the number of assembly operations involved and the nature and intricacy of the same have a great bearing upon the final cost of the reel; consequently, manufacturers are always looking for structures that will enable them to cut costs by simplifying and speeding assembly.

It is an object of this invention to simplify assembly of a bait cast reel by enabling the insertion of a guide track or member having a cover sleeve and a spacer, the assembly herein referred to as the guide for the line guide, into position between the side plates of the reel after the side plates have been brought together to form the body of the reel.

SUMMARY OF THE INVENTION

The invention contemplates an improvement in a bait cast reel of the type having a line-carrying spool, a rotatable crank handle with an associated crank shaft for imparting rotation to the spool to wind line thereon, a line guide, and a worm gear operable in response to rotation of the crank shaft for causing reciprocative movement of the line guide across the spool as the spool is rotated to thereby evenly distribute line on the spool.

The improvement is in the construction of the reel, principally the configuration of the guide, the line guide, supporting structure for the guide and a method of assembling a reel comprised of the same. The guide comprises a cylindrical section or sleeve which covers the worm gear, a parallel section which functions as a spacer and to retain the cylindrical section of the guide in alignment upon the reel frame and a web which interconnects the two. The side plates of the reel frame are configured to retain the cylindrical end sections of the guide and at least one side plate has an odd shaped aperture therein which allows the entire guide to be inserted into position from outside the assembled reel frame.

Rotation of the guide after insertion through the said odd shaped aperture positions the spacer and the cylindrical section of the guide for proper operation of the reel and brings the spacer into contact with the side plates of the reel frame.

DESCRIPTION OF THE PREFERRED EMBODIMENTS

Figure 1:
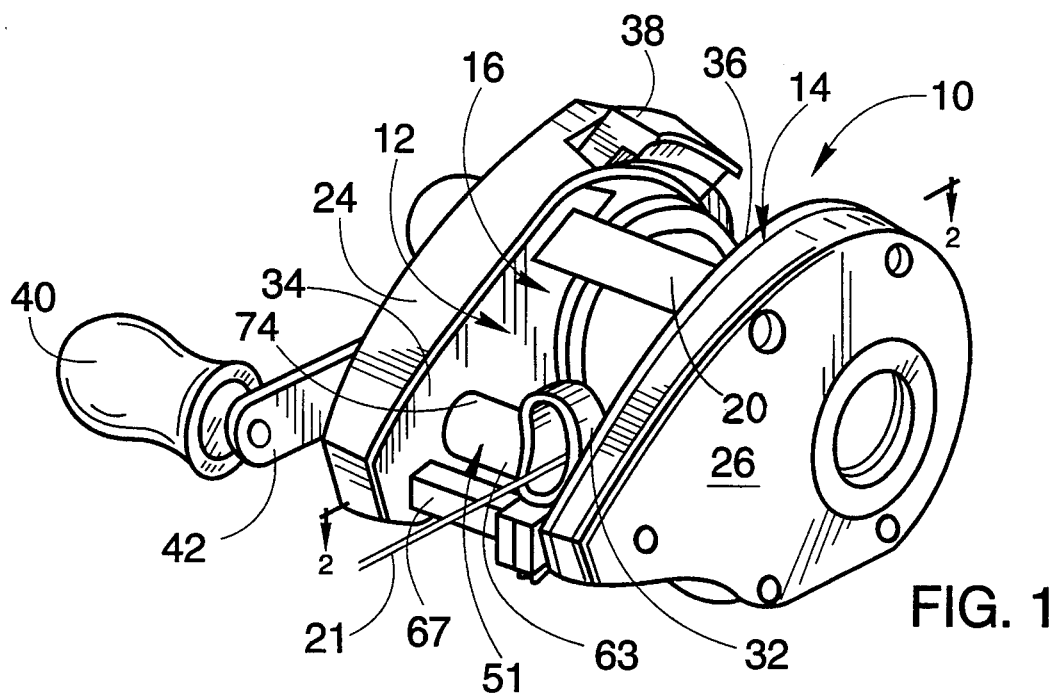
FIG. 1 is a perspective view of a bait cast fishing reel incorporating the line guide structure of the invention.
Figure 2:
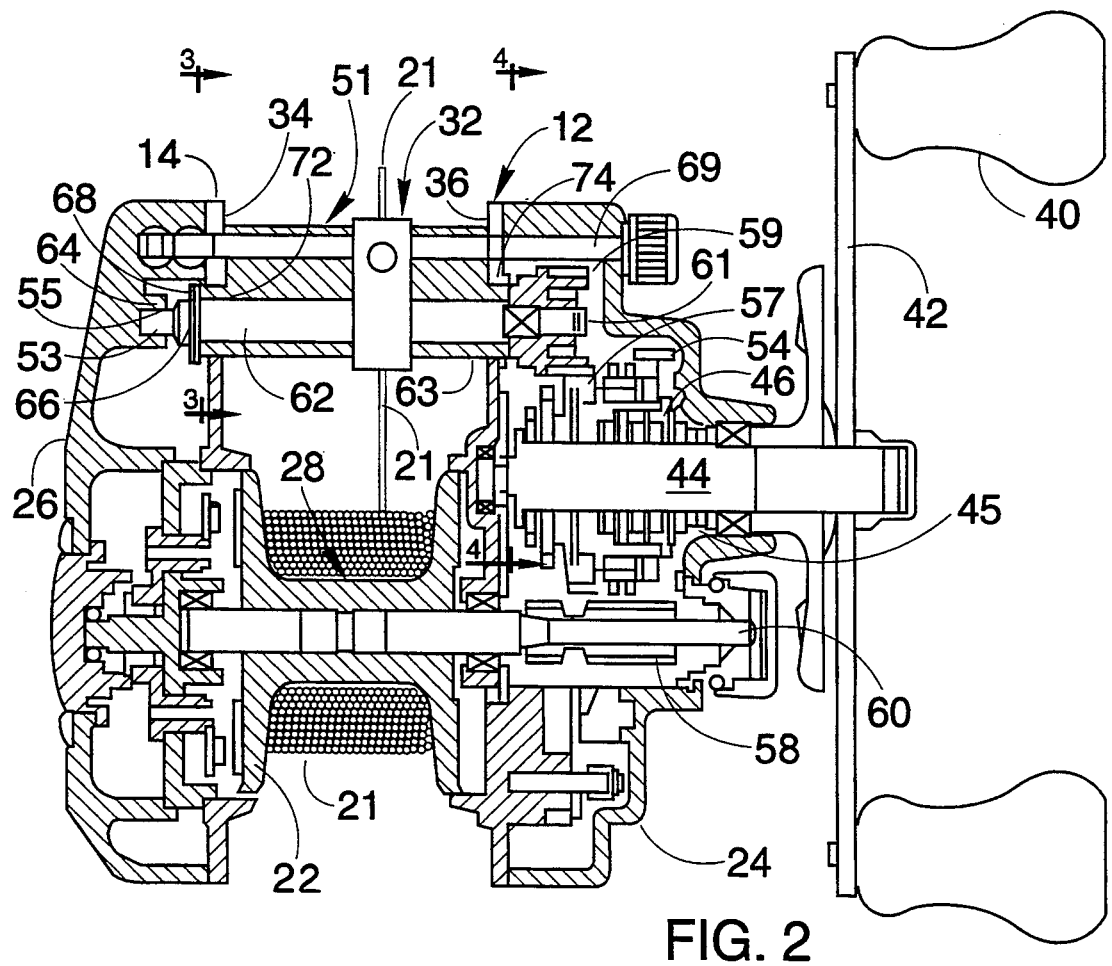
FIG. 2 is a sectional view of the reel of FIG. 1 taken along line 2—2 of FIG. 1 illustrating one preferred embodiment of the line guide structure of the invention.

FIGS. 1 and 2 show a bait cast reel 10 which incorporates a line guide structure of the invention. The basic reel 10 has a frame with laterally spaced side plates 12, 14 cooperatively bounding a spool storage space 16. The spacing between the plates 12, 14 is maintained by a plurality of laterally extending reinforcing posts 20. A line-carrying spool 22 is journalled for rotation between the plates 12, 14. The plates 12, 14 and associated covers 24, 26 respectively, enclose spaces that are occupied by conventional reel operating mechanisms. A description of the structural details of the reel depicted is not necessary to understand the present invention. The reel shown is basically the same mechanically as commercially available reels manufactured by Zebco Corporation and sold under their QUANTUM line. (QUANTUM is a registered trademark of Zebco Corporation, the assignee of the present invention.)

Referring to FIGS. 1 and 2, in operation, a supply of line 21, shown schematically in FIG. 2, is wound on the hub 28 of the spool 22. The free end of the line 21 is directed through an opening 30 in a line guide 32 that is mounted for reciprocating movement between the facing surfaces 34, 36 of the plates 12, 14 respectively, by structure described more fully below.

To pay out line, a thumb button 38 is depressed so that the spool 22 is released to spin freely. Once a desired amount of line is withdrawn, the user grabs either of two knobs 40 on a crank handle 42 to initiate rotation thereof and an associated, laterally extending crank shaft 44 to which crank gear 54 is attached through a drag assembly 45.

When the thumb button 38 is extended, the crank gear 54 is in clutched and meshed relationship with a pinion gear 58 keyed on a shaft 60 extending through and keyed to the spool 22. A second crank gear 57 on shaft 44 at the same time meshes with pinion gear 59 keyed on a shaft 61 having an associated, conventional, two direction worm gear 62. The shaft 61 extends through a sleeve 63 of a guide 51 which sleeve 63 projects beyond and between the side plates 12, 14. The distal end 66 of the shaft 61 protrudes beyond the end of sleeve 63 and is suitably secured against lateral shifting not only by a clip 68 seated in a groove in the shaft 61 but also by a reduced diameter end portion 53 seated in journal 55 which is part of side cover 26. The sleeve 63 has a longitudinal slot 64 through which engagement can be established between the worm gear 62 and the line guide 32 (see FIGS. 5 and 6).

As the crank handle 42 is operated to retrieve the line 21, the line guide 32 travels back and forth between the plates 12, 14 and its path brings it into close proximity to the facing surfaces 34, 36 on the walls 12, 14 respectively.

The invention centers around the shape of the guide 51 which includes the tubular sleeve 63, a web section 71 and a spacer section 67. The sleeve 63 shields the worm gear 62 while the entire guide 51 functions as a track upon which the line guide 32 rides as it moves back and forth to evenly distribute the line 21 as it is wound upon the spool 22.

Figure 5:
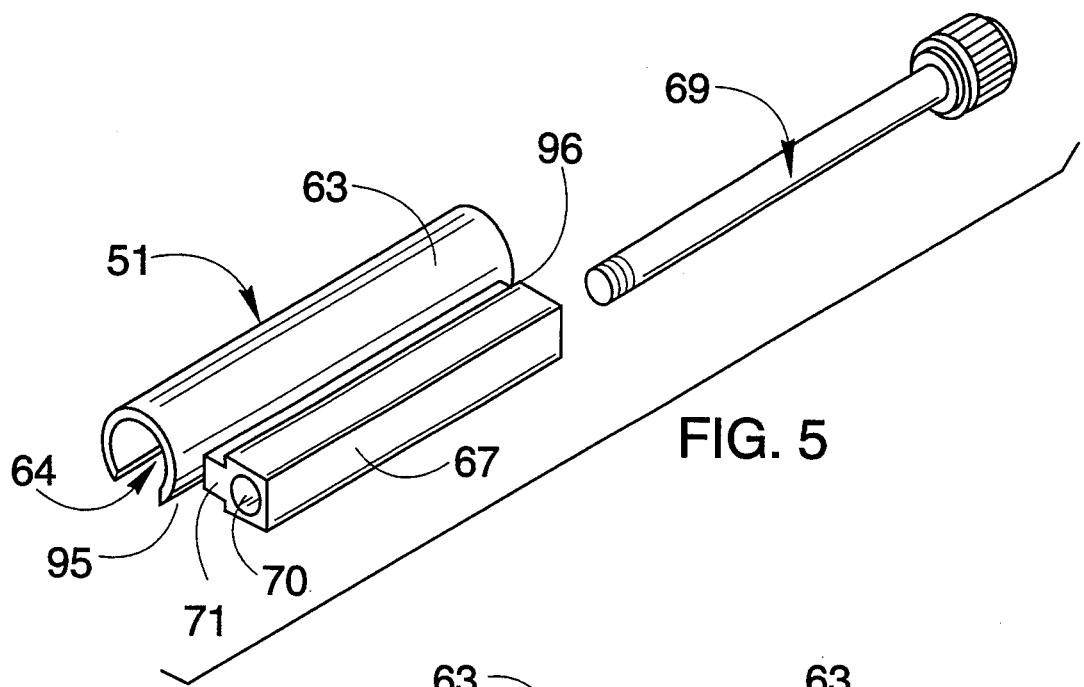
FIG. 5 is a perspective view of the line guide guide of the invention and the assembly pin that aids in holding it in position.

Referring to FIG. 5, a guide 51 has the sleeve 63 which partially surrounds and protects the worm gear 62. Integral with or attached to the sleeve 63 is the spacer 67, so that the two form a unitary structure as illustrated. The spacer 67 has a bore 70 therethrough to accommodate a threaded assembly pin 69. The web 71 connects the tubular sleeve 63 and spacer 67 to form the guide 51 wherein the sleeve 63 is parallel to the spacer 67.

Figure 6:
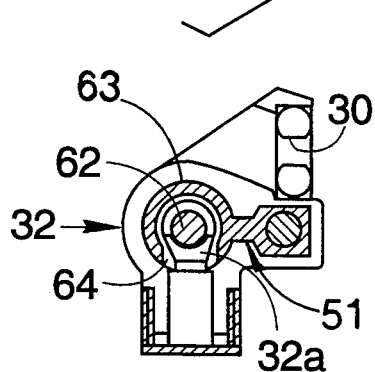
FIG. 6 is a vertical elevation in partial cross-section of the line guide in operative position over the protective sleeve and line guide track of FIG. 5 and in engagement with its double helix drive gear.

The sleeve 63 is held in position around worm gear 62 by apertures 72 and 74 in side plates 12 and 14 respectively of the reel. The worm gear 62 is held in position between the side plates 12 and 14 by the draft 61, one end 53 of which is rotatably retained by a journal 55 which forms a part of side cover 26 and the other end by the worm gear drive train 57 within cover 24 in a manner known in the art. The sleeve 63 is radially positioned during assembly to the reel so that its slot 64 opens downwardly by rotation of the guide 51 after its insertion through the aperture 80 until the bore 70 in spacer element 67 is in register with the bores 90 and 91 in the side plates. Pin 69 passes through the bore 70 and the bores 90 and 91 in the side plates and is retained there in a manner known in the art, so that the pin 69 and the spacer 67 of the guide 51 together function as one of the posts or spacers 20 of the reel frame. As illustrated in FIG. 6, the line guide 32 radially surrounds the guide 51 so that the sleeve 63, web 71 and spacer 67 together constitute the track upon which the line guide 51 traverses as the line is retrieved.

Figure 3:
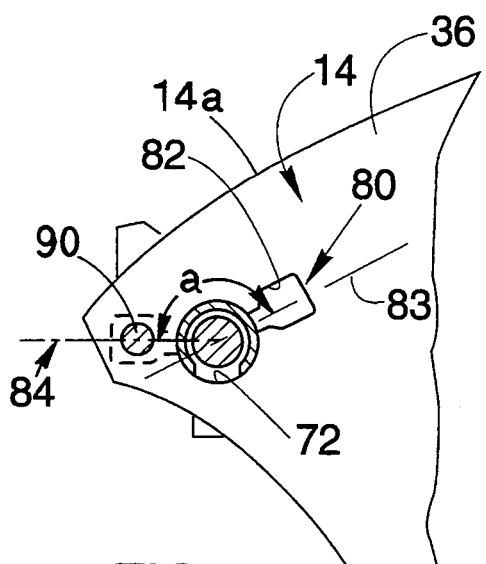
FIG. 3 is a sectional view of the reel taken along line 3—3 of FIG. 2 showing the exterior of the left side plate of the reel.

The invention further relates to the manner of insertion of guide 51 into and assembly between the side plates 12 and 14 and side covers 24 and 26. Referring to FIG. 3, a slot 80 having a shape generally matching the lateral cross-section of guide 51 is cut from side plate 14 to accommodate the insertion of guide 51 therethrough; thus enabling the insertion and assembly of the guide 51 to the reel after the side plates 12 and 14 have been assembled to form the reel frame.

Referring to FIG. 3, the aperture or slot 80 comprises a circular bore 72 sized to permit passage of sleeve 63 therethrough in a close fit relationship. Clearance between the two should be close so as to avoid wobble between the sleeve 63 and the side plate 14. Extending radially from the bore 72 is a shaped section 82 of the aperture or slot 80 which matches the cross-sectional shape of the remainder of guide 51, namely, spacer element 67 and web 71 illustrated in FIG. 5.

In assembling the guide 51 and line guide 32 on the reel, the guide 51 is inserted through aperture 80 with the slot 64 in sleeve 63 facing upward. The line guide 32 is then assembled on to the guide 51. The end 95 of the sleeve 63 is inserted in the aperture 74 in plate 12 with the spacer 67 abutting plate 12. The guide 51 and line guide 32 are then rotated counterclockwise about the axis of the sleeve 63 until bore 70 in spacer 67 aligns with apertures 90, 91 in the side plates 12, 14. The pin 69 is then inserted through cover 24, plate 12, bore 70 in spacer 67, through plate 14 and into cover 26. The end of pin 69 is threaded into cover 26 to secure the side plates 12, 14, covers 24, 26 and guide 51 in operative position on the reel.

Figure 4:
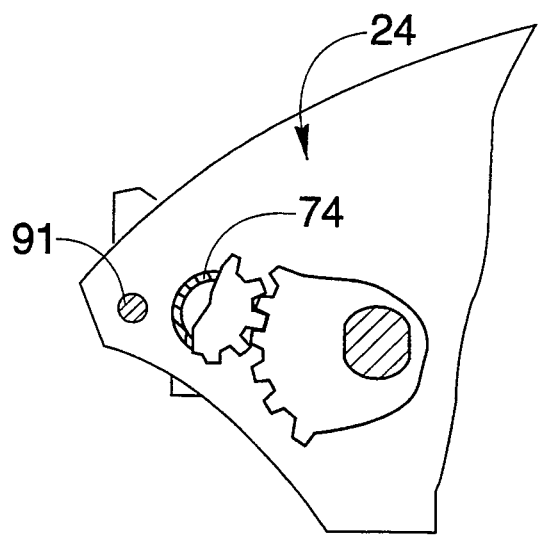
FIG. 4 is a partially broken away sectional view of the reel taken along line 4—4 of FIG. 2 showing the interior of the right side cover of the reel.

A significant feature of one preferred embodiment of the invention is that the aperture 80 is oriented in side plate 14 so that its longitudinal axis 83 forms an obtuse angle a with a line 84 extending from the geometric center of the bore 70 in element 67, to the geometric center of the sleeve 63 after the guide 51 has been inserted through the aperture 80 and rotated into position where the bore 70 is in register with holes 90 and 91 in side plates 12 and 14 respectively of the reel frame and through which assembly pin 69 passes when the reel is assembled. This positioning requires that the sleeve 63 be rotated counter clockwise approximately 135° after being inserted through the aperture 80. The orientation of slot 80 is chosen so as to cause minimal strength degradation of side plate 14 by its presence; for example, with the axis 83 generally parallel to the top edge 14a of the side plate 14. Variation of this orientation to accommodate assembly of the line guide 32 onto guide 51 is permissible. The sleeve 63 is positioned relative to worm gear 62 by the interaction of circular end portions 95 and 96 of sleeve 63 which extend beyond the ends of spacer element 67 and fit into the circular bores 72 and 74 in side plates 14 and 12 respectively, best seen in FIGS. 2, 3 and 4. The spacer 67 bears against the inside surfaces 34, 36 of side plates 14, 12, respectively, to retain the proper spacing between the side plates 12, 14.

As illustrated in FIG. 6, the line guide 32 is configured to fit around and thus ride upon guide 51 as it is moved from side-to-side by worm gear 62. A follower 32a extends from the body of the line guide 32, through the slot 64 in tubular sleeve 63 and into engagement with worm gear 62. Turning of the worm gear 62 moves the follower 32a and the line guide 32 in a manner well known in the art.

Figure 7:
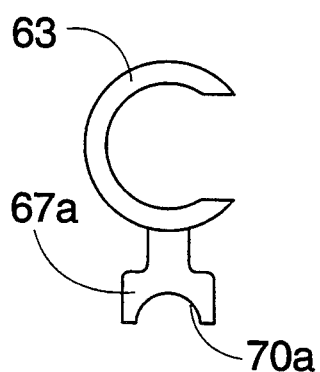
FIG. 7 is a cross-sectional view of an alternative configuration of the guide of the invention.

FIG. 7 illustrates an alternative embodiment of the invention in which the spacer 67 has an arcuate cross-section 70a configured to accept and only partially surround, but yet central retaining pin 69 when the reel is assembled.

Figure 8:
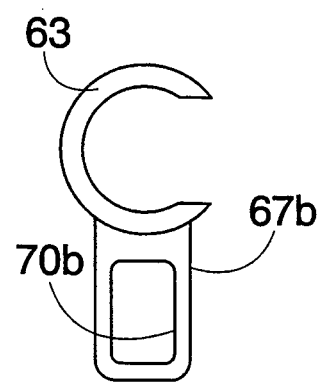
FIG. 8 is a cross-sectional view of an alternative configuration of the guide of the invention.

FIG. 8 illustrates a further embodiment of the invention in which the spacer 67 has a transversely elongated bore 70b therethrough. The bore 70b is somewhat rectangular in cross-section with the long axis of the rectangle being aligned with the axis of the sleeve 63. This configuration allows for variations in the relative spacing of the apertures 90 and 91 which position pin 69 and the apertures 72 and 74 that receive the distal ends of sleeve 63.

It will be apparent to those skilled in the art that various configurations of guide 51 will accomplish the objectives of the invention. However, it is essential to the achievement of said objectives that the spacer 67 be of sufficient length sized to fit between the side plates 12 and 14 of the assembled reel frame after the sleeve 63 has been inserted through the aperture 80 so that the tubular sleeve 63 may be rotated after such insertion to a position where the pin receiving bore 70 in spacer 67 is in register with the assembly pin retaining holes 90 and 91 in the side plates. So positioned, it is contemplated that the side plates 12 and 14 will abut tightly against the ends of the spacer 67 and web 71 of the guide 51 to assist in providing a rigid frame for the reel and track for the line guide 32.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. An improved bait cast fishing reel of the type having a reel frame including opposing side plates and a plurality of spacer posts for supporting said side plates in a fixed spaced apart relationship, a line-carrying spool and means for retaining said spool between said side plates, a rotatable crank handle with an associated crank shaft for rotating the spool so that line is wound thereon, a line guide, and rotating means for moving the line guide in a reciprocative manner axially adjacent to the spool between said side plates to distribute line evenly thereover as the spool is rotated, the improvement comprising:

guide means for supporting the line guide in relation to said rotating means for moving the line guide;

said line guide slidingly engaged upon said guide means and in cooperative contact with said rotating means for moving the line guide;

said guide means being comprised of
      sleeve means for covering a portion of said rotating means for moving the line guide, the sleeve having a longitudinal axis,
      a spacer means for supporting said side plates in fixed spaced apart relationship, the spacer means having a longitudinal axis substantially parallel to and spaced apart from the longitudinal axis of the sleeve, and
      web means for integrally connecting said spacer means to said sleeve means, means for supporting said guide means within the reel frame with the spacer means between the side plates and the longitudinal axis of the sleeve generally aligned with the longitudinal axis of the rotating means for moving the line guide, an aperture in each of the side plates adapted to receive the guide means therein wherein one of the apertures is configured to have a shape matching the cross-section of the guide means to permit passage of the guide means there-through with the longitudinal axis of the sleeve generally aligned with the longitudinal axis of the rotating means for moving the line guide, and means for fixedly retaining the guide means in an operating position whereby said aperture enables the insertion and assembly of the guide means to its operating position in the reel frame.

2. The reel of claim 1 wherein said rotating means for moving the line guide in a reciprocating manner comprises a cylindrical double helix gear and a follower engaged thereupon and attached to said line guide, and said sleeve means for covering said rotating means comprises a cylindrical portion surrounding said gear and having a slot therein to receive said follower.

3. The reel of claim 2 wherein said sleeve of said guide is cylindrical and greater in length than the distance between said side plates of the reel frame.

4. The reel of claim 2 wherein said web means extends between said sleeve means and said spacer means and thereby comprises a surface upon which said line guide rides as it is moved by said double helix gear.

5. The reel of claim 1 wherein the longitudinal axis of said one of the apertures forms an angle with a radial line extending through the longitudinal axis of the sleeve and the longitudinal axis of the spacer of said unitary structure.

6. The reel of claim 5 further including means for retaining said spacer means in a preselected position between said side plates and wherein during assembly of said reel said guide means is inserted through the aperture in one side plate which matches the cross-section of the guide means and thereafter rotated until said spacer means is aligned with said retaining means.

7. The reel of claim 6 wherein said means for attaching said spacer means of said guide means to said side plates comprises a retaining pin extending between said side plates, means for retaining said pin in fixed relationship with said side plates, and wherein said spacer means of said guide means comprises means for enclosing at least a portion of said pin.

8. The reel of claim 7 wherein said spacer means has a bore therein configured to accept therethrough said retaining pin.

9. The reel of claim 7 wherein an edge portion of said spacer means comprises a "C" shaped channel configured to accept therethrough and entrap said retaining pin.

10. The reel of claim 7 wherein the spacer means of said guide means has a rectangular bore therethrough with the long axis of the rectangle aligned with the axis of the sleeve means, the longitudinal axis of the bore is parallel to the longitudinal axis of the sleeve means.

11. The reel of claim 1 wherein said line guide comprises a body and means for drivingly connecting said body to the gear means for moving said line guide, said body and said connecting means combining to radially surround said guide means for the line guide.

* * * * *